Figure 1:
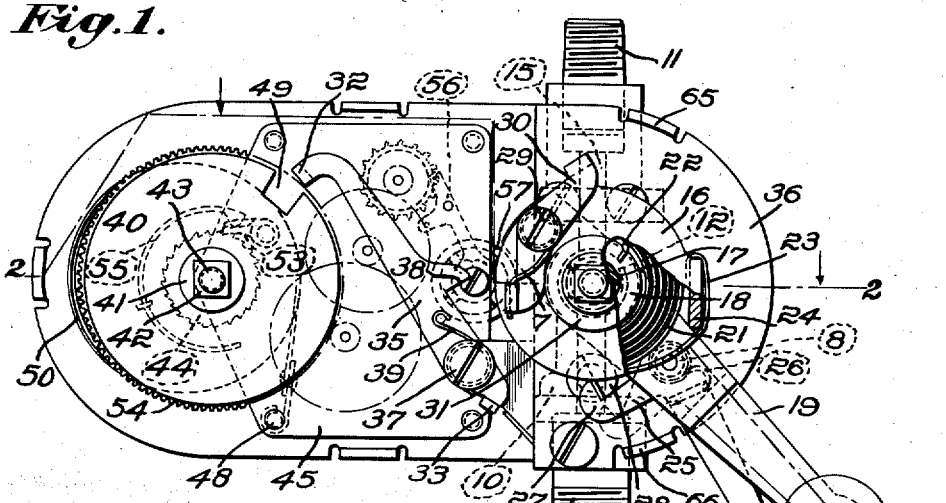

R. D. SMITH.

CONTROL MECHANISM FOR TENSION OPERATED DEVICES.

APPLICATION FILED NOV. 11, 1920.

Reissued Feb. 15, 1921. 15,044.

*Inventor:*
*Raymond D. Smith,*
*by* Emery, Booth, Yanney & Varney.
*Attys*

UNITED STATES PATENT OFFICE.

RAYMOND D. SMITH, OF EAST MILTON, MASSACHUSETTS, ASSIGNOR TO TREMONT PRODUCTS COMPANY, OF BOSTON, MASSACHUSETTS, A CORPORATION OF MASSACHUSETTS.

CONTROL MECHANISM FOR TENSION-OPERATED DEVICES.

15,044. Specification of Reissued Letters Patent. Reissued Feb. 15, 1921.

Original application filed April 9, 1917, Serial No. 160,876. Renewed September 16, 1919, Serial No. 324,226. Original No. 1,348,756, dated August 3, 1920. Application for reissue filed November 11, 1920. Serial No. 423,501.

*To all whom it may concern:*

Be it known that I, RAYMOND D. SMITH, a citizen of the United States, and a resident of East Milton, county of Norfolk, and State of Massachusetts, have invented an Improvement in Control Mechanism for Tension-Operated Devices, of which the following description, in connection with the accompanying drawings, is a specification, like characters on the drawings representing like parts.

This invention relates in general to improvements in mechanism for effecting selectively the manually caused and partially automatic movements of a tension-operated device and particularly concerns such mechanism when used with a tension-operated device having associated therewith a manually and separately energizable timing agency for automatically governing the said automatic part of its movement;—the acting forces and the strength of elements available in such an agency, as for instance a common clock train, being oftentimes relatively small and weak as compared with the relatively heavy and powerful tension required for automatically operating the said device.

The broad object of the invention is to provide a compactly organized control mechanism for use in the above described connection, and consisting of few and simple parts, whereby manual, and also time-controlled, automatic adjustment of a device adapted to be heavily tensioned for such automatic adjustment, may selectively and conveniently be had through simple and separate manual actuation of suitable handles or other control instrumentalities.

Various arrangements of mechanism for selectively effecting manual and automatic control of a tension-operated device are, of course, old in many arts and I therefore wish here to point out some of the particular advantages which my novel improvement in such mechanism provides. As an illustrative example of the principles of the invention, I herein show a suitable embodiment thereof, wherein a common form of oscillatory gas plug serves as the said tension-operated device and wherein a clock train serves as the said timing agency for governing automatic or tension-caused movement of the valve plug; and therefore I shall point out some of the characteristic and specific objects of my invention as exemplified in this particular embodiment thereof, although the scope of the invention is by no means limited to such precise embodiment; as will be evidenced by the following description and claims.

The invention aims to provide a more simple, compact and inexpensive mechanism for heavily tensioning the operated device (*e. g.*, the gas valve) and for causing the timed, automatic release thereof when so tensioned, than has heretofore been known; and a mechanism which shall include, among its novel and advantageous features of operation, the ability, at will, by manipulation of the usual valve-controlling handle to establish the valve permanently in open, partially open, or closed position in the ordinary way and independent of the associated timing agency.

A further and important object of the invention is to render more convenient the mode of manual operation of the control mechanism, and to protect the same from possible injury resulting from improper manipulation thereof, by providing an arrangement of separate controlling handles, or the like, preferably one for the valve and one for the clock train, wherein no specified sequence of manually caused valve movement relative to the operative setting of the clock is necessary. As a convenient means for operating the clock train, I employ, as the said clock-train controlling handle, the well-known arrangement of a clock-driven, combined clock-winding-and-setting pointer-hand, with positive stop means therefor, by which the clock train may always be stopped, independently of the position of other parts, in a definite position of said pointer-hand, as for instance, when the latter points to zero on a suitably graduated dial.

My invention further provides an improved form of retaining detent for the valve, novelly arranged for independent movement between the latter and said clock mechanism whereby, when the said pointer-hand is displaced from zero, the said detent is rendered operative to lock the valve in, say, an open position, and under heavy tension tending to close the same, and automatically to release the valve for closing, after a period of time proportional to the degree of displacement of said pointer-hand from zero.

To further the convenience of control to the operator and to safeguard against accidents, I provide, in addition to the designed and heretofore mentioned usual means for manually actuating the valve, a conventional, fixedly mounted valve extension herein shown as a wing-nut coöperatively arranged with a suitably marked dial, plainly and positively to indicate at all times the true position of the valve; and this extension may also serve as a positive actuating means for the valve if the clock train or mechanism for tensioning the valve should go wrong.

Former attempts at controlling, by clock mechanism or the like, the tension-caused movement of a valve of such size and of simple and approved form and gas-tight construction as herein employed, have resulted usually in modifying the said simple valve construction in order to render the valve more easily rotatable, so that a lighter valve actuating spring may be used than would otherwise be possible. It is known to those skilled in the art that, in the larger types of hand-operated gas cocks as commonly employed for controlling the flow of illuminating gas, the said simple and approved construction embodies a slightly tapered, rotatable valve plug, maintained in its seat by strong axial tension and rendered gas-tight by the use of a heavy or thick lubricant, and that such construction necessarily produces a strong frictional resistance to the turning of the valve plug. In my improved control mechanism, however, the novel detent arrangement which I employ allows the use of a valve tensioning spring of any desired magnitude, and I therefore am enabled automatically to control the movements of a firmly seated valve having the above described preferred and simple construction.

Figure 2:
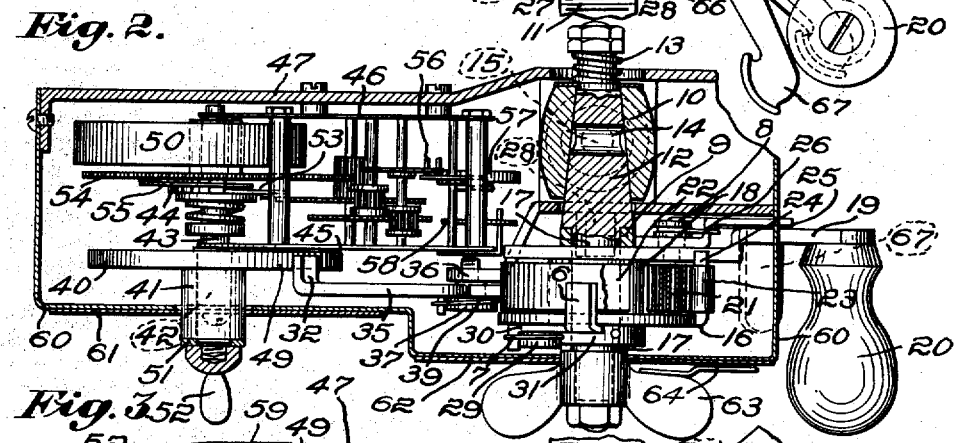
Figure 3:
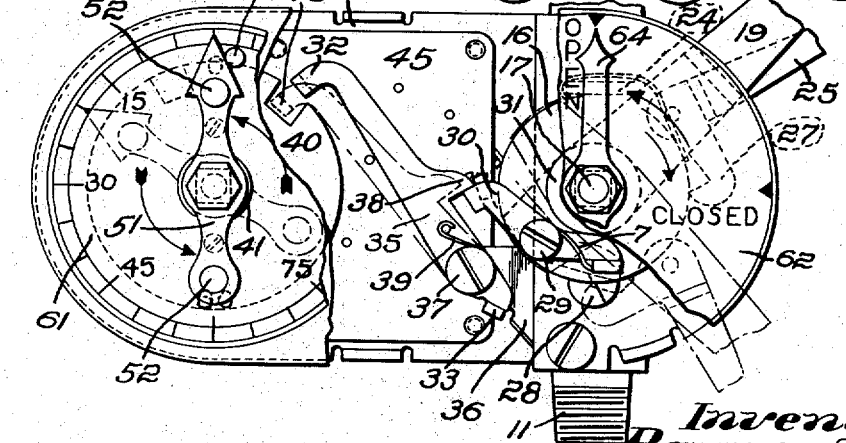

Other advantageous features, including concentric arrangement of valve stem, tensioning spring, and control handle, whereby ruggedness and compactness are effectively combined, will become apparent from the following description and from the accompanying drawings in which:

Figure 1 is a view in front elevation showing a preferred form of my improved control mechanism as applied to a time controlled and tension-operated gas valve, here shown in closed position, the casing for the mechanism being omitted and the valve dog-plate partially broken away for clearness; Fig. 2 is a sectional view looking down on the planes 2—2 in Fig. 1; and Fig. 3 is a view similar to Fig. 1, but showing different operative position of the various parts and further showing portions of the casing dials and certain operating and indicator parts associated therewith, exterior of the casing.

Similar parts are designated by the same reference numerals in all views of the drawing.

A common valve body is shown at 10 with suitably threaded terminals 11 for connecting the same in a pipe line. The usual rotative, tapered valve plug 12 is held in its seat in said body by the spring 13, as usual, and oscillates therein to control the flow of gas by varying the rotative position of the diametrical opening 14 through the plug. In Fig. 1, the opening 14 is shown as positioned transverse the valve body and therefore is out of alinement with the gas passage 15 therein, so that the valve is closed.

A dog-plate 16, having a hub 31, is rigidly pinned to the forward end or stem 17 of the valve plug, which latter is turned down at this portion to a constant diameter and carries loosely pivoted thereon, and between the dog-plate 16 and the valve body 10, a spacing washer 9 and the hub 18 of a control arm 19, provided at its end with a handle 20. A coiled ribbon spring 21 at one end 22 thereof is fastened to the hub 18 and at the other end 23 to a rearward extension 24 of the dog-plate 16, so as normally to hold said extension 24 and the arm 19 in engagement and thereby the plug 12 and the arm 19 in definite rotative relation, but separable therefrom against tension in spring 21 in one relative direction of rotation.

The arm 19 carries pivoted thereto at 8 a latch 25, formed as a bell-crank lever and positioned by the spring 26, to engage at a catch formed end 27 thereof with a lock stud 28 when the arm 19 occupies the position shown in Fig. 1. The dog-plate 16 carries pivoted thereto at 29 a latch finger 30 held yieldingly against the hub 31 of the former by a spring 7 and provided with a rearwardly extending portion 6.

A detent lever 35 is pivoted to the frame-plate 36 at the stud 37 and is normally positioned by the spring 39 and stop lug 33, so that a spur portion 38 of said lever shall be engaged by the latch finger 30 in the open position of the valve shown in Fig. 3. The extremity 32 of detent lever 35 is extended rearwardly to lie in the transaxial plane of a cam disk 40, as shown in Fig. 2, which disk is normally positioned so that a slot 49, in the periphery of the same, shall lie in the path of movement of said extremity 32. The disk 40 is mounted by means of its hub 41 on a squared portion 42 of a clock-arbor 43. This arbor carries mounted thereon with suitable frictional tightness, but so as to be relatively rotatable thereto, the ratchet wheel 44, and has bearings in frame-plates 45, 46, the latter of which is secured to a main support plate 47 extending from the valve body 10.

The frame-plates 45, 46 support therebetween an ordinary clock train consisting of a main spring 50 connected at its inner end to the arbor 43 and at its outer end to a frame post 48 and adapted to be "wound" by counter-clockwise rotation of the said arbor in Figs. 1 and 2, after which winding the said spring may act slowly to drive the arbor in the reverse direction until it is returned to its original position. A pointer-hand 51 having two operating handles 52 for turning the arbor 43 is mounted at the extremity of the square portion of said arbor and is adapted to be intercepted in its clock-driven movement by a stop pin 59, shown in Fig. 3. A gear 54 of suitable ratio is loosely mounted on the arbor 43 to be driven in a clockwise direction only, by engagement of said ratchet wheel 44 with a pawl 53, carried by the gear 54 and pressed into such engagement by a spring 55, all of which appears from Figs. 1 and 2, and is a well-known construction in the art. The remainder of the clock mechanism constitutes merely a train of ordinary retarding gears, one of which is in mesh with the gear 54, and which are governed in their movements by the usual escapement lever 56, balance wheel 57, and hair spring 58.

A casing 60 is provided to house both the valve and clock mechanism and on the outer surface of said casing is mounted a dial 61 for the clock-pointer hand 51 and a valve-position indicating plate 62. The valve stem 17 extends forwardly through the latter and has secured to the squared end thereof and exterior of the casing a wing-nut 63 and a pointer 64 carried thereby adapted to register with suitable markings on the dial for indicating the position of the valve.

The operation of the device is as follows: To open or close the valve as a non-automatic device, the handle 20 is elevated or depressed, respectively, to swing the arm 19 and valve plug 12 in unison through approximately 90° of travel, stop-means for the arm 19 being provided at each limit of its travel by frame lugs 65 and 66. After having depressed the arm to its position as in Fig. 1 to close the valve, it becomes necessary, by finger pressure upwardly on the operable end 67 of the bell-crank latch lever 25, to release the latter from engagement with the stud 28, before the valve can be opened again. Each time the valve is moved away from its fully open position, the detent lever 35 will be caused to yield to its broken-line position, as shown in Fig. 3, to permit the passage of latch finger 30.

If it be desired to place the valve under tension for automatic and time-controlled closure, the pointer-hand 51, which is normally positioned as shown in Fig. 3, is manually displaced from such position by turning the same in the direction of the arrows in Fig. 3 to some such position as indicated by the broken lines in that figure. This action rotates the cam disk 40, so that the slot 49 in the periphery thereof no longer falls opposite the rearward extension 32 of the detent lever 35, and such displacement of the cam disk obviously prevents subsequent yielding of detent lever 35, until the cam disk has been returned to its original position. In a fully opened position of the valve, therefore, the dog-plate 16 is now prevented from following up the arm 19 when the latter is swung to its position as in Fig. 1 as normally adapted to close the valve. But tension in the spring 21 is thereby established, tending to close the valve, and arm 19 will be locked in its said tensioning position by engagement of latch lever 25 with the stud 28. The cam disk 40 and pointer-hand 51 are now slowly rotated by the main spring 50 in a clockwise direction until the pointer-hand 51 again assumes its position as in Fig. 3, at which point the said pointer-hand and thereby the clock's progress is stopped by the pin 59. The slot 49 in cam disk 40 is thus again brought to register with the extremity of detent lever 35 whereby yielding of the latter is permitted to release the finger 30 and permit the valve to close. Of course, the time consumed in the return of the pointer hand and to its stopped position is proportional to the degree of original displacement therefrom, and such time may be suitably indicated by appropriate graduation on the dial 61.

Certain important and novel features of construction and operation will next be noted, after which the scope of the invention will be more concisely pointed out in the appended claims.

It will be obvious as hereinbefore stated that the pointer-hand 51 may be set for preventing the yielding of detent lever 35, without there being necessary any preliminary movement of the valve or other parts to permit such setting; because of the novel arrangement of detent lever 35, which normally does not engage with the cam disk except while yielding to permit the passage of the latch finger 30. In this connection, it should be noted that in case the pointer-hand 51 be displaced from zero, and the detent lever 35 thereby prevented from yielding while the valve is in other than fully opened position, subsequent movement of the valve to such position, for being locked therein by the detent 35, is permitted by the yielding nature of the latch finger 30.

The mechanical relation and coöperative formation of the detent parts 6, and 38, are also such that by slight variation in the shape of same any desired proportional amounts of the total tension of the valve spring 21 may be imposed respectively upon the pivot 29 and the cam disk 41. Thus it will be evident that a very powerful tension for closing the valve may be established in the spring 21 and that such tension may be operatively opposed by a very slight pressure of the detent lever 35 upon the cam disk 41, so that excessive frictional resistance to the clock-caused rotation of the disk is avoided without the use of any additional abutment agencies for lessening the said pressure on the cam disk.

Plain and true indication of the position of the valve and positive control thereof, is afforded at all times by the wing nut 63, such indication being of material benefit in the common uses of a time-controlled valve, such as in connection with a small gas water heater. When used in this capacity, also, it is common to provide an outlet in the valve body 10, for a by-pass conduit to a pilot burner usually situated in igniting relation to the heater burner.

While the actual clock train herein shown contains such ratio of gearing that one complete revolution of the disk 40 consumes approximately two hours, it will be apparent to those skilled in the art that, by suitable modification of such ratio, this time may be lengthened to twelve, twenty-four, or even more hours; and in this connection it should be stated that I do not confine myself to a concentric arrangement of the disk 40 and pointer-hand 51.

Also, while the detent-controlled device and releasing mechanism therefor is herein illustrated (with the device constituting specifically an oscillatory valve stem) as having a rotary, oscillatory movement of the said device and a rotary movement of less than a full rotation of the controlling element therefor (that is, the clock-driven disk), it will be obvious that the same arrangement for controlling a heavily tensioned device may be applied to a controlled device arranged for progressive, but interrupted, movement by stages, and in one direction only;—the said device being driven by any suitable motor such as an independently wound spring, as is common in devices adapted to be automatically operated periodically and without attention for several days. Similarly, the clock-driven disk may appropriately be driven through and desired number of full rotations. Further, in such an arrangement, a plurality of synchronously driven timing disks may be mounted, concentrically or otherwise, and arranged each to govern a separate detent in the manner that detent lever 35, herein illustrated, is governed;—this plurality of detents acting successively to retain and release progressively the said device in its rotations, thus providing a simple, time-controlled device securing by a single energization of its driving power a plurality of automatic actions of the device at the lapse of pre-determined time intervals.

The ready application of the simple principles of my invention to well-known types of devices as above described is believed to be so obvious as not to require illustration, and certain of the claims, therefore, are not limited to the specific construction of a single detent lever and to limited rotary movement of either the controlled device or of the detent controlling element, which parts I have herein shown in such simple form only for the purpose of illustration.

Many of the advantages which I have herein pointed out as resident in my novelly arranged control mechanism as applied to a gas valve are of course entirely relevant to other possible applications of this mechanism or its equivalent, as for instance to an electric switch or other useful device adapted to be operatively adjusted by manually, and when desired automatically, governed mechanical movement, and without therefore limiting the scope of my invention to the precise form thereof herein disclosed.

What I claim as new is:

1. The combination with a rotatable, tension-actuated device, of a manually operable, concentrically pivoted, and oscillatory, actuating member therefor, having abutting contact therewith and a spring connection thereto arranged yieldingly to maintain said abutting contact; a movable detent arranged normally to intercept said device and to yield for permitting the movement thereof; timing mechanism for governing said detent, operatively adjustable independently thereof, and including a reinforcing element for said detent manually movable into and out of inoperative position, and adapted automatically to be impelled to said position,—the said element being further arranged, only when displaced from its said position, to intercept said detent thereby to render the latter operative to arrest said device for a predetermined time; and a manually retractable latch for locking said member rotatively displaced from said abutting contact with said device when the latter is arrested by said detent, whereby tension is established in said spring connection for actuating said device upon release of the latter by said detent.

2. The combination with a movable, tension-actuated device; of a separately movable and manually operable, actuating member therefor, having abutting contact therewith and resilient connection thereto arranged yieldingly to maintain said abutting contact; a projection carried by said device; a detent lever pivoted to a stationary frame portion and resiliently positioned for engagement with said projection in a designed position of said device, and arranged yielding to retract about its pivot from said engagement to permit escapement of said projection therefrom; timing mechanism for governing said detent, operatively adjustable independently thereof, and including a cam for reinforcing said detent, manually rotatable into and out of an extreme inoperative position, and adapted automatically to be impelled to said position,—the said cam being formed and positioned only when displaced from its said position, to obstruct the retraction of said detent lever by engagement with a portion thereof, and thereby to render the latter operative to arrest said device for a predetermined time; and a manually retractable latch for locking said member displaced from said abutting contact with said device when the latter is arrested by said detent lever, whereby tension is established in said resilient connection for actuating said device upon release of the latter by said detent.

3. Detent mechanism for automatically releasing a device tensioned for movement, embodying in combination with said device, and an actuating member therefor having resilient connection thereto whereby displacement of said member relative to said device tensions the latter for movement; a finger carried by said device and arranged yieldingly to project therefrom to cause interception of said device only in the direction of tension-impelled movement of the latter; a movable detent formed and normally positioned, by engagement with said finger, yieldingly to oppose said movement of the device, and adapted normally to retract from said engagement to permit said movement; means for locking said detent in its normal position, including a movable element, manually displaceable from a detent releasing position thereof independently of the position of said device, and automatically returnable to said releasing position,—the said element being further arranged only when displaced from its said releasing position to intercept said detent whereby the latter is rendered operative to arrest said device for a predetermined time; and a latch to lock said member relatively displaced from said device when the latter is arrested by said detent.

4. The combination with a pivoted rotary device and means to tension the same for limited rotary movement of a projecting element carried by said device; a detent lever arranged to rock on a stationary pivot adjacent to said device; resilient means acting to rock said lever toward said device and into the path of movement of said projection, and further arranged normally to permit reverse yielding movement of said lever to permit the escape of said projection therefrom when the former is subjected to the thrust of the latter; a power-driven rotatable cam having an indented surface formed and positioned to be free of engagement with said lever in the normal position of the latter, said indented surface being adapted to prevent and permit said reverse movement of said lever by obstructing and clearing the path thereof in different rotative positions of said cam; whereby said lever is rendered operative respectively to arrest and to release said device in its tension-caused movement; the position of said lever pivot relative to the direction of thrust of said element upon said lever and the coöperative formation of the engaging portions of said element and lever being such that said thrust is borne mostly by said pivot but in part by said cam.

5. Clock-released escapement mechanism embodying in combination with a rotatable device and common means manually to actuate said device and to tension said device for escapement controlled movement; a clock-driven cam mounted for limited rotation in operative proximity to said device and operatively adjustable independently thereof; a detent lever, free of connection to said device and pivoted for oscillatory movement between a position for intercepting said device and a position for engagement with said cam; resilient means arranged normally to maintain said lever in its former position, and to permit device-caused yielding movement thereof to its said latter position for permitting the escapement of said device therefrom,—the formation of said cam being such that said yielding of the detent lever is obstructed during a portion of the cam's rotation, and permitted at a designed point thereof.

6. In combination, a power-driven rotary device;—independently power-driven rotating controlling means for said device; and a separately mounted detent member operatively interposed between said means and device, resiliently positioned normally to free said means and to engage with said device, and coöperatively arranged when unrestrained to be caused to yield from engagement with said device through pressure of said device thereon;—the said means being formed and positioned coöperatively with said detent to prevent and to permit yielding movement thereof respectively to hold and to release said device at successive rotative positions of said means.

7. In combination; an oscillatory gas valve manually adjustable for establishment in different operative positions; power means tending when energized automatically to re-adjust the valve to a definite operative position thereof; a manually adjustable timing element; separate power means operative when energized to impel said element to a stop-limited position thereof; and a detent member operatively related to said valve and arranged to be controlled by movements of said element for timing the power-caused re-adjustment of said valve, the said valve, element and detent member being respectively free from any positive interconnection and so coöperatively arranged that they are mutually free of operative constraint by one another, except when said element is displaced from its said stop-limited position.

8. In combination, a power-driven rotary device to be controlled by successively preventing and permitting rotation thereof; an independently power-driven rotating element so to control said device through auxiliary means operatively interposed between said element and device; and said auxiliary means, arranged normally to lie in the rotative path of said device but adapted to be retracted from said path by the pressure of said device thereon when otherwise unrestrained, and coöperatively arranged with said element respectively to be restrained in its normal position and to be rendered free for recession therefrom at different rotative positions respectively of said element.

9. In combination, a power-driven rotary device to be controlled by successively preventing and permitting rotation thereof; an independently power-driven rotating element so to control said device through separately mounted auxiliary means operatively interposed between said element and device; said auxiliary means being normally positioned in the path of said device and arranged normally free of operative constraint upon either said device or said element, but further coöperatively arranged so that successive engagement and disengagement therewith by said element at successive rotative positions of the latter renders said means operative respectively to hold and to release said device, thereby respectively to prevent and to permit rotation of the latter.

10. A time-controlled rotary device, having limited rotary movement and constantly tensioned for return to a fixed position against a limiting stop, comprising in combination with said device; an independently pivoted, yielding detent lever normally tensioned against a stop; coöperating detent members, one carried by said lever and one by said device, and coöperatively arranged, with one as a yielding member, to permit escapement therebetween only when said device is moved in a direction away from said position; and a power-driven rotating disk arranged coöperatively with said lever and said detent members to permit escapement of said members by yielding movement of said lever during a portion of the rotation of the disk and to prevent said escapement during another portion of disk rotation; with means manually to rotate said disk and simultaneously to control its driving means;—whereby said disk may be set, and said device may be moved to a position to be controlled by said disk, independently of the sequence of such operations.

11. A time-controlled rotary device, having limited rotary movement and constantly tensioned for return to a fixed position against a limiting stop, comprising in combination with said device; an independently pivoted, yielding detent lever normally tensioned against a stop; coöperating detent members, one formed as a fixed portion of said detent lever and the other as a yielding member carried by said device and coöperatively arranged to permit escapement therebetween only when said device is moved in a direction away from said position; and a power-driven rotating disk arranged coöperatively with said lever and said detent members to permit escapement of said members by yielding movement of said lever during a portion of the rotation of the disk and to prevent said escapement during another portion of disk rotation; with means manually to rotate said disk and simultaneously to control its driving means;—whereby said disk mav be set, and said device may be moved to a position to be controlled by said disk, independently of the sequence of such operations.

12. The combination, with a movable element, of a resilient connection to said element adapted normally to establish a designed position thereof; manually operable means for displacing said element from its said position; a projection extending from said element; a yielding detent free of connection to said element and to said projection and therewith coöperatively positioned and formed normally to be engaged by the latter and displaced thereby from the path of movement thereof when said element is moving toward its said position; means manually adjustable to prevent the said displacement of said detent and thereby to arrest said device under tension of said resilient connection; and power means, energized by the manual adjustment of said first means, to retract the latter and permit said detent to release said device.

13. Timing mechanism for a gas valve adapted for reciprocative movement between open and closed positions thereof, embodying, in combination with the valve, a manually operable controlling extension therefor; a one-way yielding projection on said extension arranged when intercepted to permit opening movement thereof; a yielding detent free of connection to said extension and positioned normally to intercept said projection in only the open position of the valve; tensioning means tending to close the valve; means normally operative to permit the escape of said projection from said detent; whereby said detent is rendered normally inoperative to arrest movement of the valve in either direction; and a clock-driven member to lock said detent in its normal position with means independently to stop the former in a position to release said detent;—said member being manually displaceable from its said position and mounted for movement free of restraint by said detent when the latter is normally positioned, whereby said member is rendered adjustable independently of the position of said valve to arrest the latter in its open position for a predetermined time.

In testimony whereof, I have signed my name to this specification.

RAYMOND D. SMITH.